May 26, 1925.
W. JOHNSON
STOCK WATERER
Filed April 10, 1924
1,539,740
2 Sheets-Sheet 1
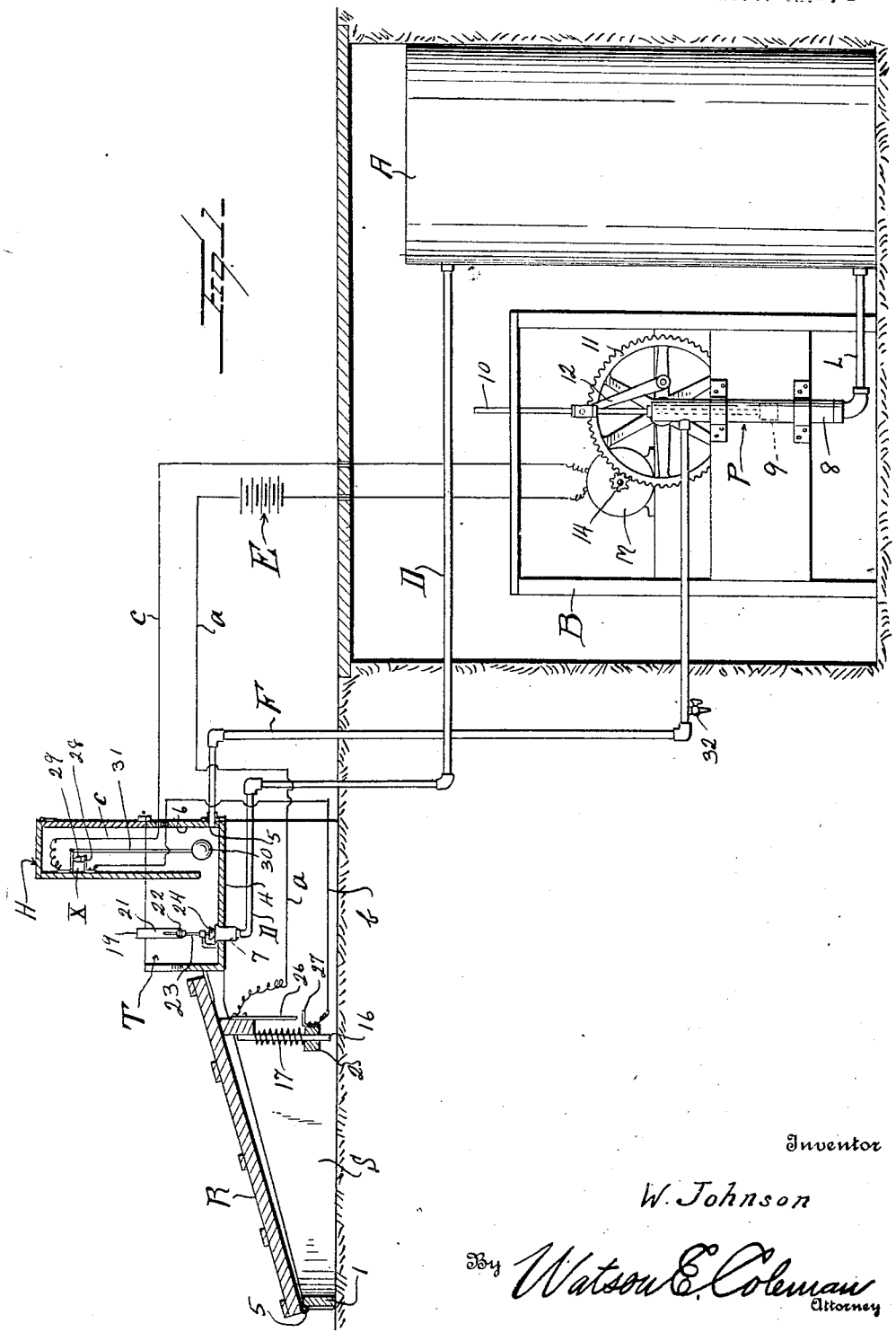
Inventor
W. Johnson
By Watson E. Coleman
Attorney May 26, 1925.
W. JOHNSON
STOCK WATERER
Filed April 10, 1924
1,539,740
2 Sheets-Sheet 2
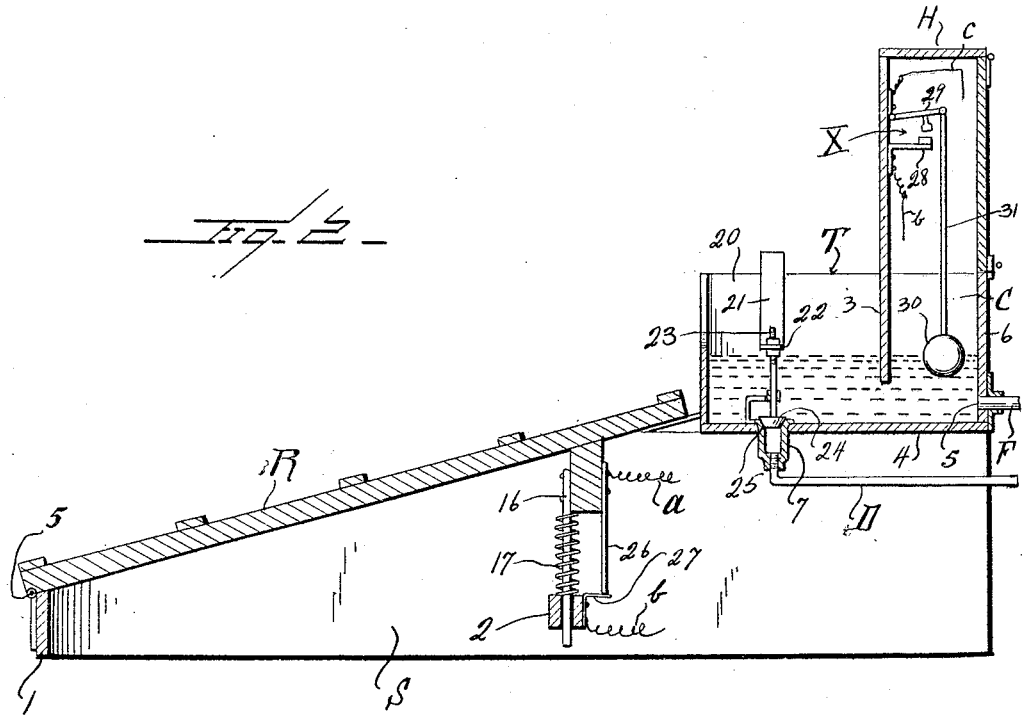
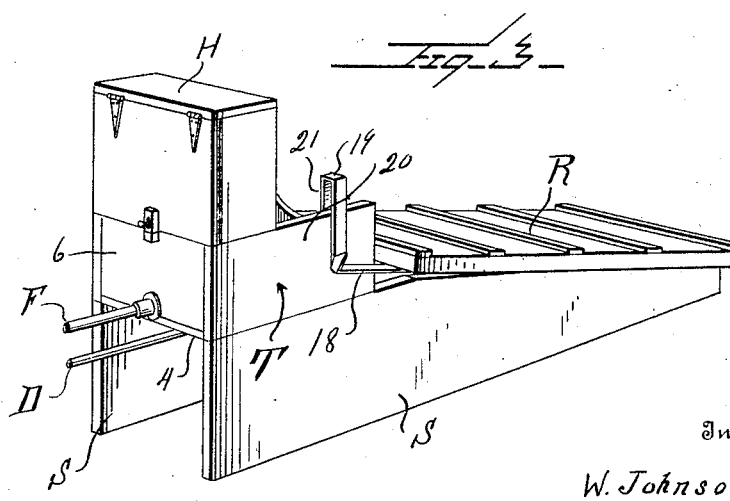
Inventor
W. Johnson
By Watson E. Coleman
Attorney Patented May 26, 1925.

1,539,740

UNITED STATES PATENT OFFICE.

WALTER JOHNSON, OF WAKONDA, SOUTH DAKOTA.

STOCK WATERER.

Application filed April 10, 1924. Serial No. 705,547.

*To all whom it may concern:*

Be it known that I, WALTER JOHNSON, a citizen of the United States, residing at Wakonda, in the county of Clay and State of South Dakota, have invented certain new and useful Improvements in Stock Waterers, of which the following is a specification, reference being had to the accompanying drawings.

This invention relates to certain improvements in stock waterers and has relation more particularly to a device of this general character especially designed and adapted for use in connection with hogs, and it is an object of the invention to provide a novel and improved device of this general character comprising a normally empty tank or trough which is automatically supplied with a desired amount of water upon the proper approach of the animal to the tank or trough.

Another object of the invention is to provide a novel and improved device of this general character comprising a normally empty tank or trough in communication with a source of water supply and with which is associated an electrically operated pump, the circuit of which is normally open, said circuit being automatically closed to operate the pump to deliver the desired amount of water within the tank or trough upon the proper approach of the animal, together with means whereby the circuit for the pump is broken when the level of the water within the tank or trough reaches a predetermined height.

The invention consists in the details of construction and in the combination and arrangement of the several parts of my improved stock waterer whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view partly in elevation and partly in section and of a somewhat diagrammatic character illustrating a stock waterer constructed in accordance with an embodiment of my invention.

Figure 2 is a longitudinal vertical sectional view taken through the runway and water tank or trough and the parts concomitant thereto; and Figure 3 is a view in perspective of the structure as shown in Figure 2, taken from the inner or rear end thereof.

As disclosed in the accompanying drawings, T denotes a tank or trough of desired dimensions and which is supported at a desired elevation by the parallel sills S. The sills S extend beyond one end of the tank or trough T and the upper edges of the extensions of said sills are disposed downwardly on a predetermined incline. The outer extremities of said extensions are connected by a cross member 1. The sills S, or more particularly the extensions thereof, at a point in advance of but in relatively close proximity to the tank or trough T, are also connected by a cross member 2, said cross member 2 being a desired distance below the lower edges of the sills.

Extending upwardly from the end portion of the tank or trough T remote from the extensions of the sills S is a housing H, the bottom of which is open to afford unhindered communication though the housing within the trough or tank T and the forward wall 3 of the housing extends downwardly within the trough or tank T and terminates at a point closely adjacent to the bottom 4 of the trough or tank whereby the rear portion of the trough or tank T is divided to provide a float chamber C.

Discharging, as at 5, within the lower portion of the float chamber C and preferably through the rear wall 6 of the tank or trough T is a supply or feed pipe line F. In communication with the opposite or forward end portion of the trough or tank T through the bottom wall 4 is a stand 7, said stand being also in communication with a discharge or outlet pipe line D.

A denotes a supply tank of desired capacity and which is preferably located below the ground level and preferably within a subterranean chamber so that the water within said supply tank is protected against freezing. The discharge pipe line D leads to the tank A and is in communication therewith at the upper portion thereof.

The pipe line F leads from a pump P in suitable communication through the pipe line L with the lower portion of the supply tank A. As herein disclosed, the pump P embodies a vertically disposed cylinder 8 in which is mounted for rectilinear movement a piston 9. The piston 9 is operatively engaged through the medium of the rod 10 with a driven wheel 11 so that, upon rotation of the wheel 11, the piston 9 will be operated to draw the water from within the supply tank A to the trough or tank T. As herein disclosed, the rod 10 and the wheel 11 are in operative connection through the medium of the pitman 12.

As herein disclosed, the wheel 11 is in driven connection with the drive shaft 14 of an electric motor M. The wheel 11 and the motor M are operatively supported by a frame structure B suitably located within the subterranean chamber.

R denotes a runway overlying the extensions of the sills S and bridging the space therebetween. The outer or lower extremity of the runway R is pivotally or hingedly connected, as at 15, with the cross member 1 whereby the runway R is capable of swinging movement in a vertical direction. The runway R is of a length to closely approach the forward end of the trough or tank T and depending from said runway R at a point in relatively close proximity to the trough or tank T is a rod 16 which is also slidably disposed through the cross member 2 hereinbefore referred to.

Interposed between the runway R and the cross member 2 is an expansible member 17 herein disclosed as a coil spring encircling the rod 16 and which expansible member or spring operates to normally maintain the inner or upper end portion of the runway R raised or out of contact with the sills S. In practice, I find it desirable to have the expansible member or spring 17 of a tension to withstand a weight up to substantially twenty pounds, although I do not wish to be understood as limiting myself in this particular, as the tension of the member or spring 17 may be varied as the necessities of practice may dictate.

The runway R is of a width greater than the major width of the trough or tank T and extending outwardly from the upper or inner end of the runway R at one side of the tank or trough T is an arm 18 of a length to extend a slight distance along a side of the trough or tank T. This arm 18 is continued by an upwardly disposed extension or member 19 substantially in the form of an inverted U and which bridges the adjacent side wall 20 of the trough or tank T so that a leg 21 of said member 19 extends inwardly of the trough or tank T.

The lower or free end portion of this interior leg 21 is provided with a foot 22 to which is operatively engaged the stem or rod 23 of the valve 24. When the runway R is depressed, the valve 24 is also moved downwardly and engages the seat 25 at the induction end of the stand 7 so that, when a hog or other animal is upon the runway R, flow through the pipe line D is closed.

The operating circuit for the motor M includes a conductor $a$ leading from the motor to a contact member 26 depending from the upper or inner end portion of the runway R and which contact member 26, when the runway R is depressed, electrically engages a contact 27 carried by the cross member 2. To insure the desired engagement between the contact members 26 and 27 and the seating of the valve 24, the arm 18 is resilient to compensate for any inequalities or irregularities which may occur.

Arranged within the housing H is a circuit closer X comprising a stationary contact member 28 and a movable contact member 29, said movable contact member 29, as herein disclosed, having swinging movement in a vertical direction. The contact 27 is in electrical connection through the conductor $b$ with the stationary contact 28 and the movable contact 29 is in electrical connection with the motor M through the conductor $c$. Interposed in one of the conductors, as $a$, is a source E of electrical energy.

Within the float chamber C is arranged a float 30 provided with an upstanding rod 31 operatively engaged with a movable contact member 29. The contact members 28 and 29 are normally in electrical engagement but when the float 30 is moved upwardly by the rise of the water level within the tank or trough T, the contact members 28 and 29 are separated so that the operating circuit for the motor M is broken. When the members 28 and 29 are in contact, the float 30 is spaced a predetermined distance above the bottom 4 of the tank or trough T, said space being in accordance with the maximum height of the water level desired within the trough or tank T.

When a hog or other animal walks up the runway R, the runway will be depressed, resulting in the contacts 26 and 27 engaging to close the circuit for the motor M, resulting in the pump P operating to deliver water from within the tank A to the tank or trough T. As the level of the water within the tank or trough T rises and closely approaches the desired water level, the float 30 will move upwardly, causing the contact members 28 and 29 to separate, breaking the circuit for the motor and thereby stopping the pump P.

When the hog or other animal leaves the runway R, the expansible member or spring 17 will automatically raise or elevate the runway R and at the same time move the valve 24 into open position so that the water remaining within the tank or trough T will discharge through the pipe line D back to the supply tank A. When the runway R is raised, the contact members 26 and 27 separate and as the water passes from within the trough or tank T, the float 30 will lower and the contacts 28 and 29 return to their normal position.

During the period the hog or other animal is upon the runway R and drinking the water within the trough or tank T, my present invention assures the maintenance of the desired water level within the trough or tank T.

The lower portion of the line F is provided with a drain cock 32 and which is preferably adapted to be opened when the temperature is at freezing or below freezing. By this means, when the tank or trough T is drained, the water within the upper or exposed portion of the pipe line F will also be drained and thereby effectively avoiding the device becoming inoperative or otherwise hindered or obstructed by ice.

From the foregoing description it is thought to be obvious that a stock waterer constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A waterer of the class described comprising a tank normally substantially empty, a feed line leading from a source of water supply and delivering within the tank, a discharge line in communication with the tank and leading therefrom, a pump interposed in the first named line, an electric motor for operating the pump, a depressible runway, the operating circuit for the motor being normally open, means operating upon depression of the runway to close the circuit, a valve for controlling the flow through the discharge pipe line, and means carried by the runway and associated with the valve to move the valve into closed position upon depression of the runway and to move the valve into open position when the runway is elevated.

2. A waterer of the class described comprising a tank normally substantially empty, a feed line leading from a source of water supply and delivering within the tank, a discharge line in communication with the tank and leading therefrom, a pump interposed in the first named line, an electric motor for operating the pump, a depressible runway, the operating circuit for the motor being normally open, means operating upon depression of the runway to close the circuit, a valve for controlling the flow through the discharge pipe line, means carried by the runway and associated with the valve to move the valve into closed position upon depression of the runway and to move the valve into open position when the runway is elevated, and means for constantly urging the runway into a raised position.

3. A waterer of the class described comprising a tank normally substantially empty, a feed line leading from a source of water supply and delivering within the tank, a discharge line in communication with the tank and leading therefrom, a pump interposed in the first named line, an electric motor for operating the pump, a depressible runway, the operating circuit for the motor being normally open, means operating upon depression of the runway to close the circuit, a valve for controlling the flow through the discharge pipe line, means carried by the runway and associated with the valve to move the valve into closed position upon depression of the runway and to move the valve into open position when the runway is elevated, a normally closed circuit closer interposed in the operating circuit for the motor, and means operating upon the rise of the level of the water within the tank to open said closer.

4. A waterer of the class described comprising a tank normally substantially empty, a feed line leading from a source of water supply and delivering within the tank, a discharge line in communication with the tank and leading therefrom, a pump interposed in the first named line, an electric motor for operating the pump, a depressible runway, the operating circuit for the motor being normally open, means operating upon depression of the runway to close the circuit, a valve for controlling the flow through the discharge pipe line, means carried by the runway and associated with the valve to move the valve into closed position upon depression of the runway and to move the valve into open position when the runway is elevated, a normally closed circuit closer interposed in the operating circuit for the motor, and a float within the tank and operatively connected with said closer to open said closer upon upward movement of the float under the influence of the water discharged within the tank.

In testimony whereof I hereunto affix my signature.

WALTER JOHNSON.